United States Patent [19]
Malinowski

[11] Patent Number: 5,551,613
[45] Date of Patent: * Sep. 3, 1996

[54] TAPE HOLDER WITH NOTCHED BACK PANEL

[76] Inventor: Casimier L. Malinowski, 747 Warford Ave., Vallejo, Calif. 94590

[*] Notice: The term of this patent shall not extend beyond the expiration date of Pat. No. 5,450,994.

[21] Appl. No.: 321,724

[22] Filed: Oct. 12, 1994

Related U.S. Application Data

[63] Continuation-in-part of Ser. No. 308,136, Sep. 19, 1994, Pat. No. 5,450,994.

[51] Int. Cl.$^6$ ........................................... A45F 5/00
[52] U.S. Cl. .................. 224/666; 224/904; 224/673; 224/677; 24/10 A; 24/10 R; D3/228
[58] Field of Search ................... 224/250, 255, 224/242, 269, 270, 249, 222, 904, 224, 226; D3/215, 218, 219, 228; 24/10 A, 3 F, 3 H, 10 R

[56] References Cited

U.S. PATENT DOCUMENTS

| | | | |
|---|---|---|---|
| D. 161,571 | 1/1951 | Davenhauer | D3/228 |
| D. 254,103 | 2/1980 | Criswell | D3/228 |
| D. 280,860 | 10/1985 | Leath | D3/218 |
| D. 328,191 | 7/1992 | Reitz | D3/228 |
| 1,356,902 | 10/1920 | Benyei | 24/3 F |
| 4,119,249 | 10/1978 | Hanson | 224/253 |
| 4,619,020 | 10/1986 | Lecher, Sr. | 224/252 |
| 4,757,927 | 7/1988 | Rutty | 224/904 |
| 4,821,933 | 4/1989 | Seber | 224/904 |
| 5,038,985 | 8/1991 | Chapin | 224/904 |
| 5,100,037 | 3/1992 | Kopyta et al. | 24/3 F |
| 5,257,729 | 11/1993 | Silvernail | 224/222 |
| 5,375,749 | 12/1994 | Oliva | 224/904 |

Primary Examiner—Henry J. Recla
Assistant Examiner—Gregory M. Vidovich
Attorney, Agent, or Firm—Harold D. Messner

[57] ABSTRACT

Auxiliary holder for releasably stowage of a tensionable measuring tape, comprises a back panel formed of leather or like material. The back panel has a front surface terminating in top, bottom and side edges. In one embodiment, a pair of slots are formed in the back panel after which a front panel is attached therebetween wherein a tight-fitting pocket is formed. The back panel also includes a rectangular notch or opening used to stow the cantilevered leg of the rear drop shaped clip of the measuring tape. Attachment of the holder to the user's body is via serpentining the user's belt through the pair of transversely spaced slots constructed in the back panel wherein the serpentining begins at one of the slots in which the non-buckle end of the belt passes through from the front surface of the back panel through the slot and thence along the rear surface of the back panel and out the other of the slots. In yet another embodiment, a pocket to accommodate a carpenter's pencil is achieved by changing the shape of the back panel to a L-shaped and then extending the width of the front panel. Result: a pair of side-by-side pockets can be formed—one; accommodate the carpenter's pencil—the other; receive the cantilevered leg of the tear drop shaped clip of the measuring tape.

9 Claims, 4 Drawing Sheets

TAPE HOLDER WITH NOTCHED BACK PANEL

This application is a continuation-in-part of Ser. No. 08/308,136 entitled "MEASURING TAPE HOLDER WITH NOTCHED BACK PANEL AND RIVETED CLIP MEANS" filed Sep. 19, 1994, now U.S. Pat. No. 5,450,994 issued Sep. 19, 1995.

SCOPE OF THE INVENTION

The present invention relates to a holder for a spocketed measuring tape and more particularly to such a holder provided with a notched planar back panel which releasably accepts the conventional tear-drop shaped clip of such a measuring tape.

BACKGROUND OF THE INVENTION

Conventional spocketed measuring tapes include a cylindrical housing that confines a spired measuring tape within its cavity but permits the measuring tape to elongate through a radial opening connecting the cavity to the exterior, under tension, as shown in U.S. Pat. Nos. 3,905,114 and 4,434,952 incorporated herein by reference. A trigger locking stop permits the user to fix a given length of the tape exterior of the housing for measuring purposes. A tear-drop shaped clip is attached to the belt or pocket of the user. Such clip has a fixed leg attached to the back side of the cylinder and a free leg that cantilevers from the fixed leg and a terminating tip bent under tension to rest against such back side for attachment purposes.

Experience has shown many circumstances in which such measuring tape is difficult to stay attach to the clothing of the user via such tear-drop shaped clip, say where the belt or pocket of the user is tight fitting or the user must bend many times at his waist during tasking operations. In this regard, the art is replete with auxiliary holders or aprons for retaining the measuring rule relative to the user's clothing. However, such auxiliary holders are relatively expensive to manufacture, especially if they include a separate belt; are awkward to use since they do not correctly position the measuring tape relative to the user's belt for easy insertion and retrieval; or do not easily attach or release the tape relative to the holder irrespective of the user's body position. An experienced carpenter usually has a set position for stowage of his measuring tape. If attached to his front pocket of his pants, the measuring tape extends down from the top flap a distance that places the tape adjacent to his hand when the latter is in a relaxed position at his side. If attached to his belt, it desirable that the measuring tape be similarly positioned.

In my prior application cited above, there is disclosed an auxiliary holder for releasably stowage of a spocketed, tensionable measuring tape, comprising a back panel formed of leather or like material as well as a front panel located relative to the back panel between its side edges adjacent to its associated bottom edge to form a tight-fitting pocket therebetween. Attachment of the front panel to the back panel is by means of four rivets placed adjacent to the corners of the front panel. The back panel also includes a rectangular notch or opening, such notch being dimensioned to slidably accept the cantilevered leg of the tear drop shaped clip of the measuring tape for stowage therein. Attachment of the holder to the user's body is via clip means riveted to the back panel of the holder near its top edge. One embodiment of the invention uses the user's belt as the fastening post wherein attachment occurs by means of a single clip of tear-drop shaped cross section. Another embodiment of the invention uses the user's front pocket of his pants or coveralls wherein attachment occurs by means of two clips of tear-dropped cross section riveted to the back surface of the back panel in a vertical position above the pocket formed by the front and back panels of the holder.

However, I have now discovered that when my invention is used in the first mode described above, i.e. where the user's belt is used as the fastening post, such embodiment is easily modified in the following aspects:

(i) to accommodate a carpenter's pencil say of a flat, rectangular cross section simply, by changing the shape of the back panel to a L-shape and then extending the width of the front panel. Result: the back panel is positioned coextensively of the transverse leg of the front panel and easily forms a pair of side-by-by pockets between it and the back panel—one to accommodate the carpenter's pencil and the other to receive the cantilevered leg of the tear drop shaped clip of the measuring tape for stowage therein;

(ii) to allow the omission of the single tear-drop shaped clip to attach the back panel relate to the user's belt, by forming a pair of transversely extending slots in the back panel adjacent to the side edges, reducing the width of the front panel to be disposed between the slots before the rivets are attached. Result: the user's belt can be inserted through the slots in a serpentine manner in which the belt end is inserted through a rear slot from front to back, then behind the back panel where the latter is coextensive with the front panel and thence out of the front slot for attachment to the belt buckle in convention manner;

(iii) to allow the omission the front panel as a separate unit by forming a pair of transversely extending slots in the back panel adjacent to the side edges of the latter, and then inserting the user's belt through the slots in a serpentine manner in which the belt end is inserted through a rear slot from back to front, then in front of the back panel over the central region of the latter and thence into the forward slot from front to the back of the back panel and thence onto the belt buckle for attachment in convention manner.

SUMMARY OF THE INVENTION

The present invention relates to an auxiliary holder for releasably stowage of a spocketed, tensionable measuring tape, comprising a back panel formed of leather or like material. The back panel has a front surface terminating in top, bottom and side edges.

In one embodiment of the invention, a pair of longitudinally extending slots are formed in the back panel adjacent to the side edges of the latter after which a front panel also of rectangular cross section, is attached therebetween wherein the bottom edges of the front and rear panels are coextensive and permit a tight-fitting pocket to be formed between the front and back panels. Attachment of the front panel to the back panel is by means of four rivets placed adjacent to the corners of the front panel after the latter has been laid flat against the back panel. The back panel also includes a rectangular notch or opening wherein as previously explained can be used to stow the cantilevered leg of the tear drop shaped clip of the measuring tape. Attachment of the holder to the user's body is via serpentining the user's belt through the pair of slots in which the non-buckle end of the belt is inserted through a rear slot starting at the front of the holder, then through the slot to the back of the holder, then behind the back panel where the latter is coextensive with the front panel and thence out of the front slot for attachment to the belt buckle in convention manner.

In another embodiment of the invention, the front panel is entirely omitted. In this embodiment, a similar positioned pair of slots are formed in the back panel adjacent to the side edges of the latter as set forth above. Attachment of the holder to the user's body is via serpentining the user's belt through the pair of slots in which the non-buckle end of the belt is inserted through a rear slot starting from the rear surface of the back panel to the front surface of the panel, then a cross the front surface of the back panel, thence into the front slot to the rear surface of the panel and then forward to the belt buckle for attachment in convention manner. The notch in the back panel is of similar shape as hereinbefore described except that it is positioned more toward the center of the back panel. Hence, the belt itself, forms—along with the back panel—a pocket in which the measuring tape can be stowed via stowage of the cantilevered leg of the clip of the measuring tape within the notch.

In yet another embodiment of the invention, a pocket to accommodate a carpenter's pencil say of a flat, rectangular cross section simply, is achieved by changing the shape of the back panel to a L-shape and then extending the width of the front panel. Result: the back panel is positioned coextensively of the transverse leg of the front panel and easily forms a pair of side-by-side pockets between it and the back panel—one to accommodate the carpenter's pencil and the other to receive the cantilevered leg of the tear drop shaped clip of the measuring tape for stowage therein.

DETAILED DESCRIPTION OF THE INVENTION

Since the embodiments of the present invention shown in FIGS. 14–19 share operating characteristics with those presented in my parent application, their description will be present in abbreviated form after a detailed description of my prior embodiments has occurred.

Figures 1, 2, 3, 4, 5, 7, 8:
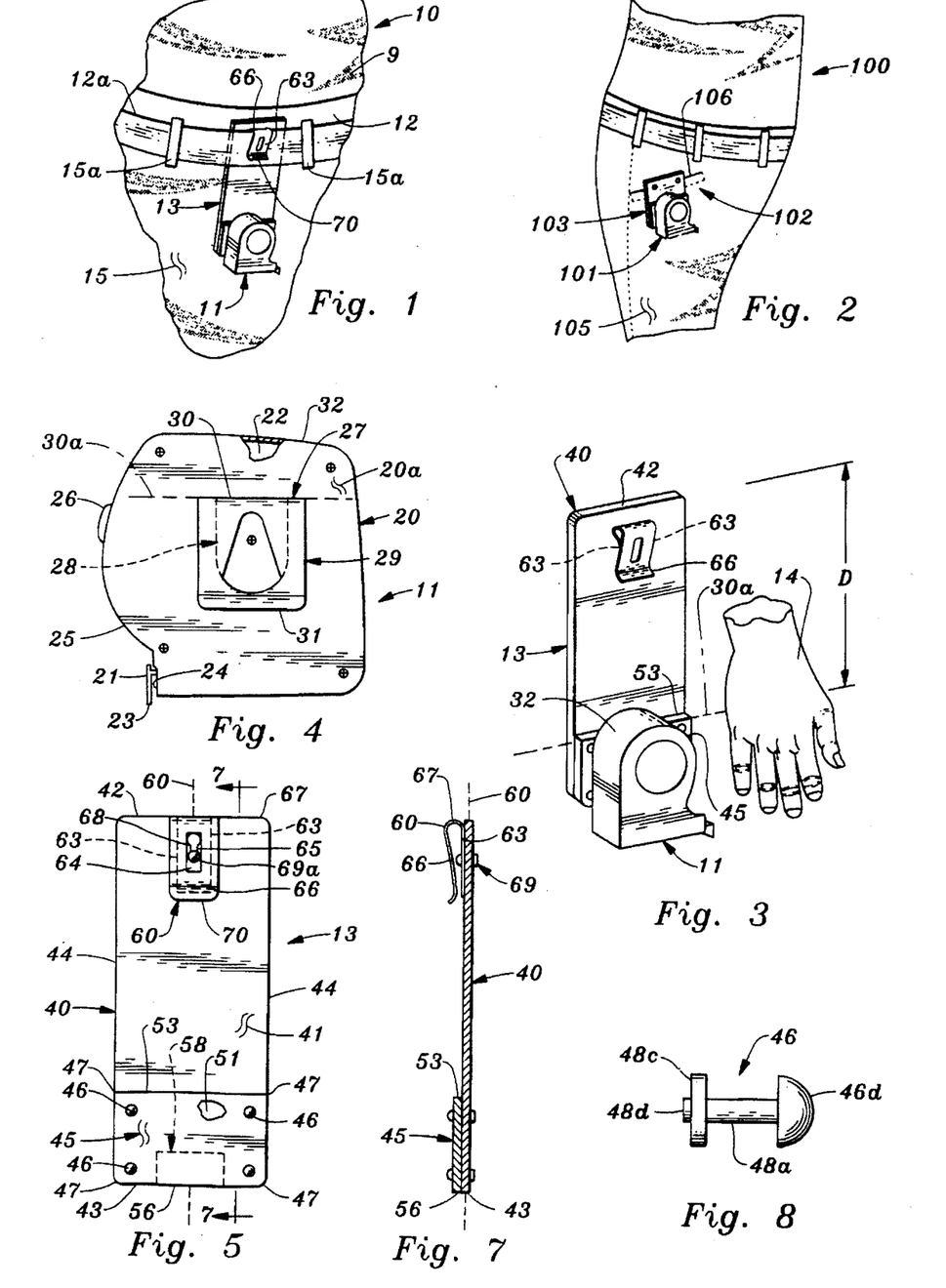
FIG. 1 is a partial side view of a user of the invention showing the position of a conventional sprocketed measuring tape in attachment within one embodiment of the holder of the invention, such holder being attached to the user's belt.
FIG. 2 is a second partial side view of the user of FIG. 1, showing the position of a conventional sprocketed measuring tape in attachment within a second embodiment of the holder of the invention, such holder being to a front pocket of user's pants.
FIG. 3 is a detail perspective view of the measuring tape and holder of FIG. 1.
FIG. 4 is a detail side view, partially cutaway, of the measuring tape of FIG. 1 in which the tape has been rotated 180 degrees so as to shown a tear-drop shaped clip.
FIG. 5 is a front plane view of the holder of FIG. 1.
FIG. 7 is section taken along line 7—7 of FIG. 5.
FIG. 8 is a detail side view of a pop rivet used in the manufacture of the holder of FIG. 5.

With reference to FIGS. 1 and 3, a portion of torso 9 of a user 10 is shown in which a conventional spocketed measuring tape 11 is attached, say to his belt 12 via auxiliary holder 13 of the invention. As shown in FIG. 3 the user's hand 14 hangs adjacent to the measuring tape 11. The user's belt 12 is attached to the user's clothing, say a pair of pants 15 via belt loops 15a.

FIGS. 3 and 4 shows the measuring tape 11 in detail.

As shown, the measuring tape 11 includes a cylindrical housing 20 that confines a spired measuring reel 21 within its cavity 22 but permits tip 23 of the measuring reel 21 to elongate through a radial opening 24 connecting the cavity 22 exterior of side edge 25, under tension, as shown in U.S. Pat. Nos. 3,905,114 and 4,434,952 incorporated herein by reference. A trigger stop 26 permits the user to fix a given length of the tape 21 exterior of the housing 20 for measuring purposes. A clip 27 is attached to the cylindrical housing 20 to permit tape 11 to be releasably attached to the belt 12 of the user 10, FIG. 1. Such clip 27 is tear-drop shaped in cross section with a fixed leg 28 attached to back side 20a of the housing 20 and a free leg 29 that cantilevers from a common junction 30 having a transverse axis 30a, such cantilevered leg 29 having a tip 31 bent under tension to rest against such back side 20a of the housing 20 for attachment purposes.

Figure 6:
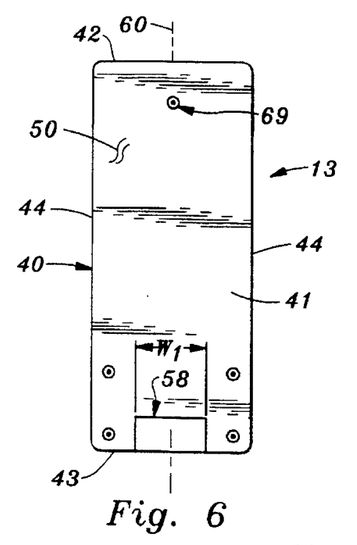
FIG. 6 is a rear plan vie of the holder of FIG. 1.

FIGS. 5–7 show auxiliary holder 13 in more detail.

As shown, the auxiliary holder 13 includes a back panel 40 formed of leather of rectangular cross section. Such back panel 40 includes having a front surface 41 terminating in top, bottom and side edges 42, 43, and 44, respectively, to which a front panel 45 also of rectangular cross section, is attached. A rear surface 50 of the back panel 40 is of similar dimensions as the front surface 41 and terminates in the top, bottom and side edges 42, 43, 44 in similar manner.

Front panel 45 is attached to the back panel 40 between the side edges 44 adjacent to the bottom edge 43 of the back panel 40 to form a pocket 51 therebetween. Attachment of front panel 45 to the back panel 40 is by means of four pop rivets 46 placed adjacent to four corners 47. As shown in FIG. 8, each of such rivets 46 has a shaft 48a, a head 48b and washer fastener 48c. Each of the rivets 46 extends through the front surface 41 of the back panel 40 and then is attached at an enlarged end 48d via washer fastener 48c. The pocket 51 thus defined includes an opening at transverse upper edge 53 of thickness T where T is about ⅛ inch. The pocket 51 also includes a second opening at a transverse lower edge 56 of the front panel 45 which is coincident with the bottom edge 43 of the back panel 40. A rectangular notch or opening 58 is also formed in the back panel 40, such notch 58 being bisected by a longitudinal axis of symmetry 60 of the holder 13. The notch 58 and transverse upper edge 53 are dimensioned to aid in the releasable acceptance of the measuring tape 11 of FIG. 4. That is, the transverse edge 53 of the front panel 45 is engineered so that the tip 31 of the clip 27 of the measuring tape 11, see FIG. 4 can slide thereover to be releasably attached relative to the holder 13. And the notch 58 is formed to slidably accept the cantilevered leg 29 of the same clip 27 for stowage therein. Thus, width W1 of the rectangular notch 58 in the back panel 40 is engineered to permit entry of cantilevered leg 29 of the clip 27, therein but wherein the holder 13 itself is attached such that upper surface 32 of tape 11 is positioned adjacent to the user's hand 14 the latter is positioned at his side, see FIG. 3. That is, referring to FIGS. 3 and 4, the topmost surface 32 of the measuring tape 11 is positioned within the holder 13 of the invention such that a distance D is defined between the transverse axis 30a of the junction 30 between the fixed and free legs 28, 29 of the clip 27 of the measuring tape 11 (such axis 30a being coincident with the transverse upper edge 53 of the pocket 51), and the tope edge 42 of the back panel 40 so as to place such topmost surface 32 adjacent to his hand 14 when the latter is in a relaxed position at the side of the user. In this regard, D is equal to about 4½ inches.

Returning to FIGS. 5–7, attachment of the holder 13 to the user is via clip means 60 riveted to the back panel 40 near its top edge 42, such clip means 60 including a single clip. Such single clip 60 is of tear-dropped cross section having a fixed leg 63 defining a road surface 64 having a slot 65 and another leg 66 that cantilevers from common apex 67. Note that such cantilevered leg 66 also has a transverse oval slot 68 therein to permit a rivet fastener 69a to be attached to pop rivet 69, such rivet 69 securing the clip 60 relative to back panel 40. Cantilevered leg 66 also includes a tip 70 bent inward toward the rivet 69 to provide a gripping force between such tip 70 and the front surface 41 of the back panel 40 so as to provide attachment.

In such position, as shown in FIG. 3, proper relationship between the user's hand 14 and the measuring reel 11 is provided. Attachment of the measuring tape 11 and holder 13 of FIGS. 1 and 3 occurs as follows: the user 10 first takes the holder 13 in his hand 14 and pushes the holder 13 upwardly between his belt 12 and his pants 15, between adjacent belt loops 15a until the tip 70 of the cantilevered leg 66 is above top edge 12a of the user's belt 12. Then the user 10 pulls the holder 13 downward so that the fixed and cantilevered legs 63, 66 of the clip 61 slidably attaches to front and back surfaces of the belt 12. Additional frictional attaching forces are seen to act between the belt 12, the back panel 40 and the user's pants 15 that lay between adjacent belt loops 15a to assure that the holder 13 does not become dislodged from the belt 12 during normal tasking operations.

ALTERNATE EMBODIMENT

FIGS. 2, 9–13 show an alternate embodiment of the invention.

Figure 9:
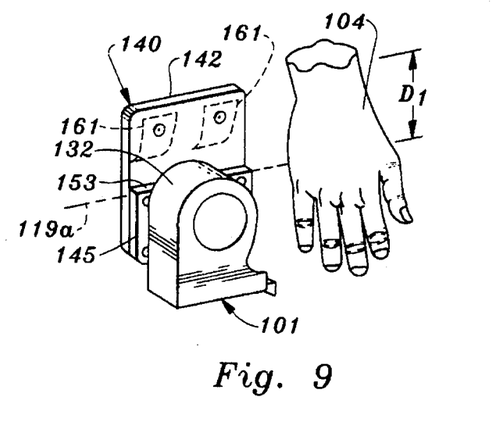
FIG. 9 is a detail perspective view of the measuring tape and holder of FIG. 2.

In FIGS. 2 and 9, a user 100 is shown in which a conventional spocketed measuring tape 101 is attached to the user's front pocket 102 via an alternative auxiliary holder 103 of the invention. The user's hand 104 hangs adjacent to the measuring tape 101.

Figure 10:
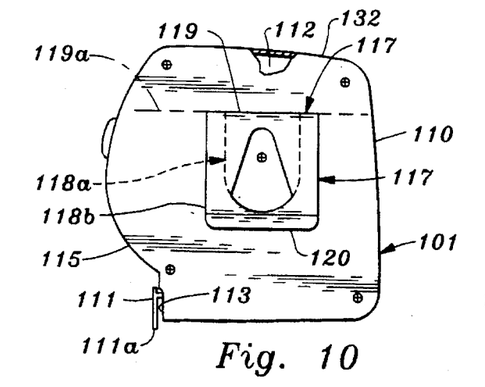
FIG. 10 is a detail side view, partially cutaway, of the measuring tape of FIG. 2 similar to that shown in FIG. 4.

FIG. 10 shows the measuring tape 101 in detail and is similar to that depicted in FIG. 4. Suffice it to say the tape 101 includes a housing 110, a spired measuring tape reel 111 within its cavity 112, such reel 111 having a tip 111a penetrating through a radial opening 113 connecting the cavity 112 exterior of side edge 115, under tension. A clip 117 is attached to the cylindrical housing 110 to permit such tape 101 to be releasably attached to the belt 102 of the user 100. Such clip 117 is tear-dropped shaped in cross section and is the same as previously described, including a fixed leg 118a attached to housing 110 and a free leg 118b that cantilevers from junction 119 having transverse axis 119a, such cantilevering free leg 118b having a tip 120 bent under tension to rest against such housing 110 but movable in an opposite direction to permit insertion of a fixed element, such as holder 103 for attachment purposes therebetween.

Figure 11:
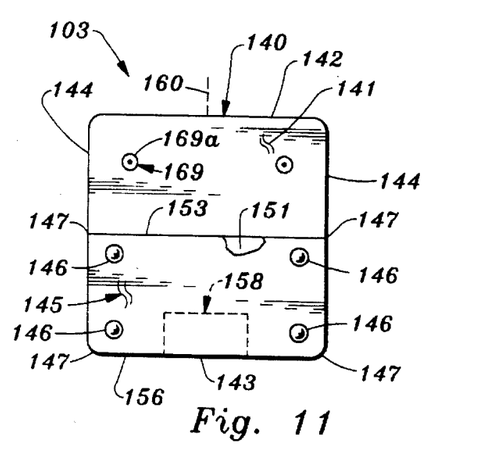
FIG. 11 is a front plan view of the holder of FIG. 2.
Figure 12:
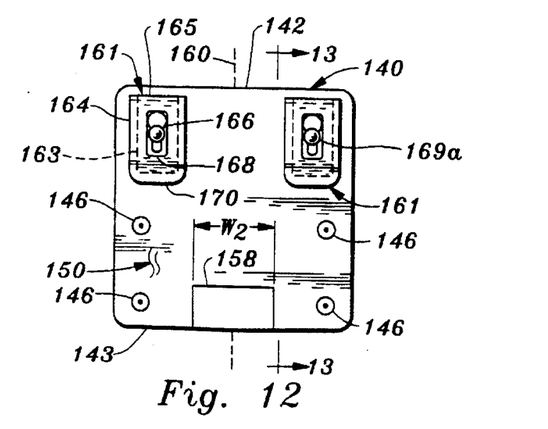
FIG. 12 is a rear plan view of the holder of FIG. 2.
Figure 13:
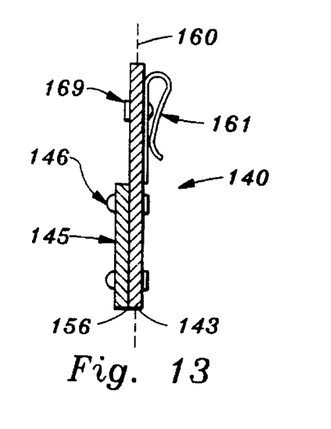
FIG. 13 is a section taken along line 13—13 of FIG. 12.

FIGS. 11–13 show auxiliary holder 103 in more detail. As shown, the auxiliary holder 103 includes a back panel 140 formed of leather of rectangular cross section. Such back panel 140 includes having a front surface 141 terminating in top, bottom and side edges 142, 143, and 144, respectively, to which a front panel 145 also of rectangular cross section, is attached. A rear surface 150 of the back panel 140 is of similar dimensions as the front surface 141 and terminates in the top, bottom and side edges 142, 143, 144 in similar manner.

Front panel 145 is located relative to the back panel 140 between the side edges 144 adjacent to the bottom edge 143 of the back panel 140. Its attachment to the back panel 140 is by means of four rivets 146 placed adjacent to four corners 147 of the front panel 145, such rivets 146 as similar to that depicted in FIG. 8. A pocket 151 thus defined is located between the back and front panels 140, 145 and includes an opening at transverse upper edge 153. The pocket 151 also includes a second opening at a transverse lower edge 156 of the front panel 145 which is coincident with the bottom edge 143 of the back panel 140. A rectangular notch or opening 158 is formed in the back panel 140, such notch 158 being bisected by a longitudinal axis of symmetry 160 of the holder 103. The notch 158 and transverse upper edge 153 are dimensioned to aid in the releasable acceptance of the measuring tape 101 of FIG. 9. That is, the transverse edge 153 of front panel 145 is engineered so that the tip 120 of the clip 117 of measuring tape 101, see FIG. 10 can slide thereover to be releasably attached relative to the holder 103. And the notch 158 is formed to slidably accept the cantilevered leg 118b of the same clip 117 for stowage therein. Thus, the width W2 of the rectangular notch or opening 158 in the back panel 140 is engineered to permit entry of cantilevered leg 118b of the clip 117, therein but wherein the holder 103 itself is attached such that upper surface 132 is positioned adjacent to the hand 104 of the user, when the latter is positioned at his side, see FIG. 9. That is, referring to FIGS. 2 and 9, the topmost surface 132 of the measuring tape 101 is positioned within the holder 103 of the invention such that a distance D1 is defined between the transverse axis 119a of the junction 119 between the fixed and free legs 118a, 118b of the clip 117 of the measuring tape 101 (such axis 119a being coincident with the transverse upper edge 513 of the pocket 151), and top edge 142 of the back panel 140 so as to place such topmost surface 132 adjacent to his hand 104 when the latter is in a relaxed position at the side of the user. In this regard, D1 is equal to about 2 inches.

Returning to FIGS. 11–13, attachment of the holder 103 to the user 100 is via clip means 161 riveted to the back panel 140 near its top edge 142, such clip means 161 including a pair of transversely aligned clips, each being of a tear-dropped cross section and having a fixed leg 163 and a cantilevered free end 164 that depends from the fixed leg 163 from a common apex or junction 165. Within the fixed leg 163 is a slot 166 extending through a broad surface. Note that such cantilevered leg 164 also has a transverse oval slot 168 therein to permit a rivet fastener 169a to be attached to rivet 169, such rivet 169 securing each of the clips 161 relative to back panel 140. Each cantilevered leg 164 also includes a tip 170 bent inward toward the rivet 169 to provide a gripping force between such tip 170 and the rear surface 150 of the back panel 140 so as to provide attachment. Attachment of the measuring tape 101 and holder 103 to the user 100 of FIG. 2 occurs as follows: the user 100 uses his front pocket 102 of his pants or coveralls 105 for such purpose wherein attachment of the measuring tape 101 and holder 103 occurs by means of the clips 161 previously described in detail attached to top edge 106 of the pocket 102. In such position, the measuring tape 101 is correctly positioned adjacent to the user's hand 104. Attachment occurs as follows: the user 100 first rises the tips 170 of both clips 161 above top edge 106 of the front pocket 102 of the user's pants or coveralls 105 and then pushes same downward so that their fixed and cantilevered legs 163, 164 slidably attached to the interior surface of front pocket 102. Additional frictional attaching forces occur because of the use of two clips 161 and by the fact that rivet fasteners 169a attaching the clips 161 to the holder 103 of the invention, are positioned such that they and the associated tips 170 pinch a segment of the user's front pocket 102 to place such segment under tension to assure that the holder 103 does not become dislodged from the pocket 102.

FURTHER ALTERNATE EMBODIMENTS

Further alternate embodiments of the holder of the invention are shown in FIGS. 14–18. These embodiments are three in number and will be described in sequence.

FIRST FURTHER ALTERNATE

Figures 14, 15:
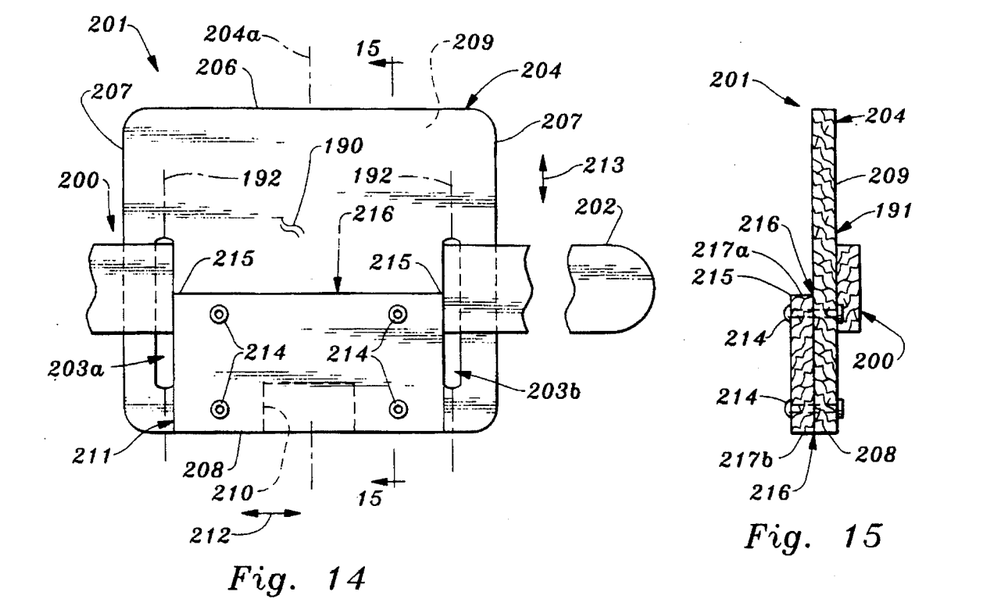
FIG. 14 is a front plan view of another embodiment of the holder of the invention which uses the user's belt as the positioning posts for attachment of the holder to the user, such holder including a pair of positioned slots through which the non-buckle end of a belt serpentines.
FIG. 15 is a section taken along line 15—15 of FIG. 14.

As shown in FIG. 14 and 15, a user's belt 200 is shown in attachment with modified holder 201 of the invention by serpentining non-buckle end 202 of the belt 200 through a pair of slots 203a, 203b formed in back panel 204. As shown, the back panel 204 is rectangular in cross section and includes a longitudinal axis of symmetry 204a from which the slots 203a, 203b are equally offset relative thereto, a front surface 205 terminating in a top edge 206, a pair of upright side edges 207 and a bottom edge 208, and a rear surface 209 of similar shape as the front surface 205. A notch 210 is formed in the back panel 204. Note that a first central region 190 is formed on the front surface 205 longitudinally extending between the pair of slots 203a, 203b, while a similar shaped second central region 191 is formed on and associated with the rear surface 209. Note further that the slots 203a, 203b each have an axis of symmetry 192 that is parallel with the axis of symmetry 204a of the back panel 204 and equally offset therefrom.

Front panel 211 is located atop the front surface 205 of the back panel 204 between the slots 203a, 203b in the transverse direction designated by arrow 212 and coincident with the bottom edge 208 in the longitudinal direction indicated by arrow 213. Its attachment to the front surface 205 of the back panel 204 is by means of four rivets 214 placed adjacent to four corners 215 of the front panel 211, such rivets 214 as similar to that depicted in FIG. 8.

A pocket 216 thus defined is located between the back and front panels 204, 211 and include an opening at transverse upper edge 217a. The pocket 216 also includes a second opening at a transverse lower edge 217b of the front panel 211 which is coincident with the bottom edge 208 of the back panel 204. Rectangular notch or opening 210 formed in the back panel 204, is bisected by the longitudinal axis of symmetry 204a. The notch 210 and transverse upper edge 216 are dimensioned to aid in the releasable acceptance of the measuring tape 101 of FIG. 9 as explained before.

Returning to FIGS. 14 and 15, attachment of the modified holder 201 to the user's belt 200 is achieved by serpentining the non-buckle end 202 of the belt 200 through a pair of slots 203a, 203b as follows. The non-buckle end 202 of the belt 200 is inserted through slot 203a (assuming the holder 103 is to place on the user's right side) starting with penetration of the slot 203a from the front surface 205 of the back panel 204, then pulling the end 202 of the belt 200 along the second central region 191 associated with the rear surface 209 of the back panel 204 where the latter is coextensive with the front panel 211 and thence out of the front slot 203b for attachment to the belt buckle (not shown) of the belt 200 in conventional manner.

SECOND FURTHER ALTERNATE

Figures 16, 17:
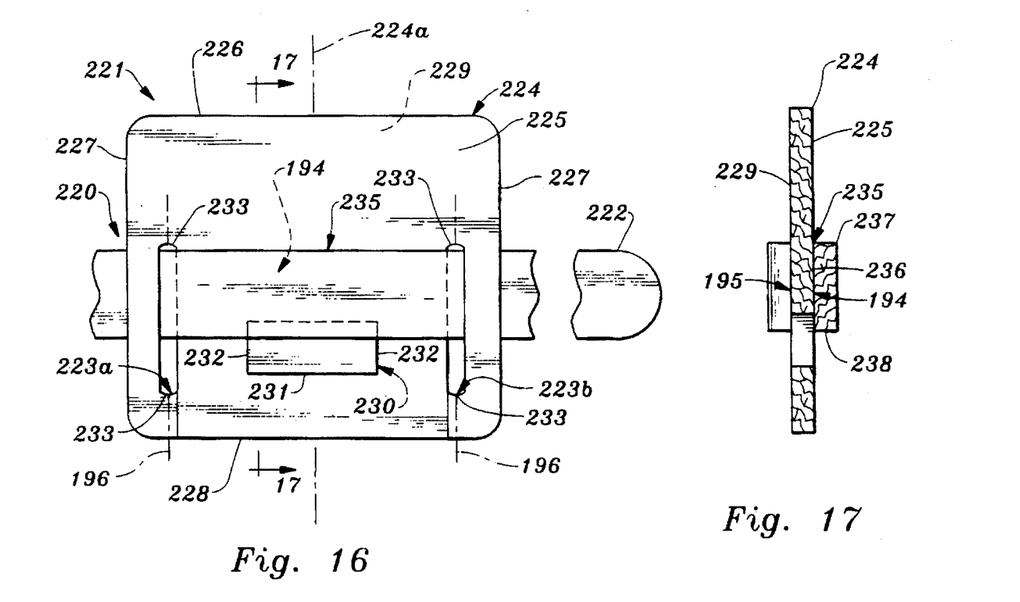
FIG. 16 is a front plan view of yet another embodiment of the holder of the invention which uses the user's belt as both the positioning post for attachment of the holder to the user and as the front panel of the pocket for stowage of the measuring tape, such holder including a pair of positioned slots through the non-buckle end of a belt serpentines.
FIG. 17 is a section taken along line 17—17 of FIG. 16.

As shown in FIGS. 16 and 17, a further modification of the invention is shown in which the front panel 211 of the FIGS. 14, and 15 is entirely omitted.

As shown in FIG. 16 and 17, user's belt 220 is shown in attachment with modified holder 221 of the invention by serpentining non-buckle end 222 of the belt 200 through a pair of slots 223a, 223b formed in back panel 224. As shown, the back panel 224 is rectangular in cross section and includes a longitudinal axis of symmetry 224a from which the slots 223a, 223b are equally offset relative thereto, a front surface 225 terminating in a top edge 226, a pair of upright side edges 227 and a bottom edge 228, and a rear surface 229 of similar shape as the front surface 225. A notch 230 is formed in the back panel 224 and includes parallel sides 231 and parallel ends 232 that are coextensive of the slots 223a, 223b, i.e., transverse planes through ends 233 of the slots 223a, 223b capture the notch 230 therebetween.

Note that a first central region 194 is formed on the front surface 225 longitudinally extending between the pair of slots 223a, 223b, while a similar shaped second central region 195 is formed on the rear surface 229. Note further that the slots 223a, 223b each have a axis of symmetry 196 that is parallel with the axis of symmetry 224a of the back panel 224 and equally offset therefrom.

Attachment of the modified holder 221 to the user's belt 220 creates both a pocket 235 between rear surface 236 of the belt 220 and the front surface 225 of the back panel 224 and attachment of the holder 221 relative thereto. Such attachment is achieved by serpentining the non-buckle end 222 of the belt 220 through the pair of slots 223a, 223b formed in back panel 224 as follows. The non-buckle end 222 of the belt 220 is inserted through slot 223a (assuming the holder 221 is to place on the user's right side) starting with penetration of the slot 223a from the rear surface 229 of the back panel 224, then pulling the end 222 of the belt 220 along the first central region 194 of the front surface 225 of the back panel 224 and thence into the front slot 223b for contact with the rear surface 229 before attachment to the belt buckle (not shown) of the belt 220 in convention manner.

Note that the pocket 235 is formed between the rear surface 236 of the belt 220 and the front surface 225 of the back panel 224 with upper edge 237 of the belt 220 serving as the upper edge of the pocket 235 and lower edge 238 serving as the lower edge of the pocket 235. In addition, the notch 230 and transverse upper edge 237 of the belt 220 interact to aid in the releasably acceptance of the measuring tape 101 of FIG. 9 as explained before.

THIRD FURTHER ALTERNATE

Figures 18, 19:
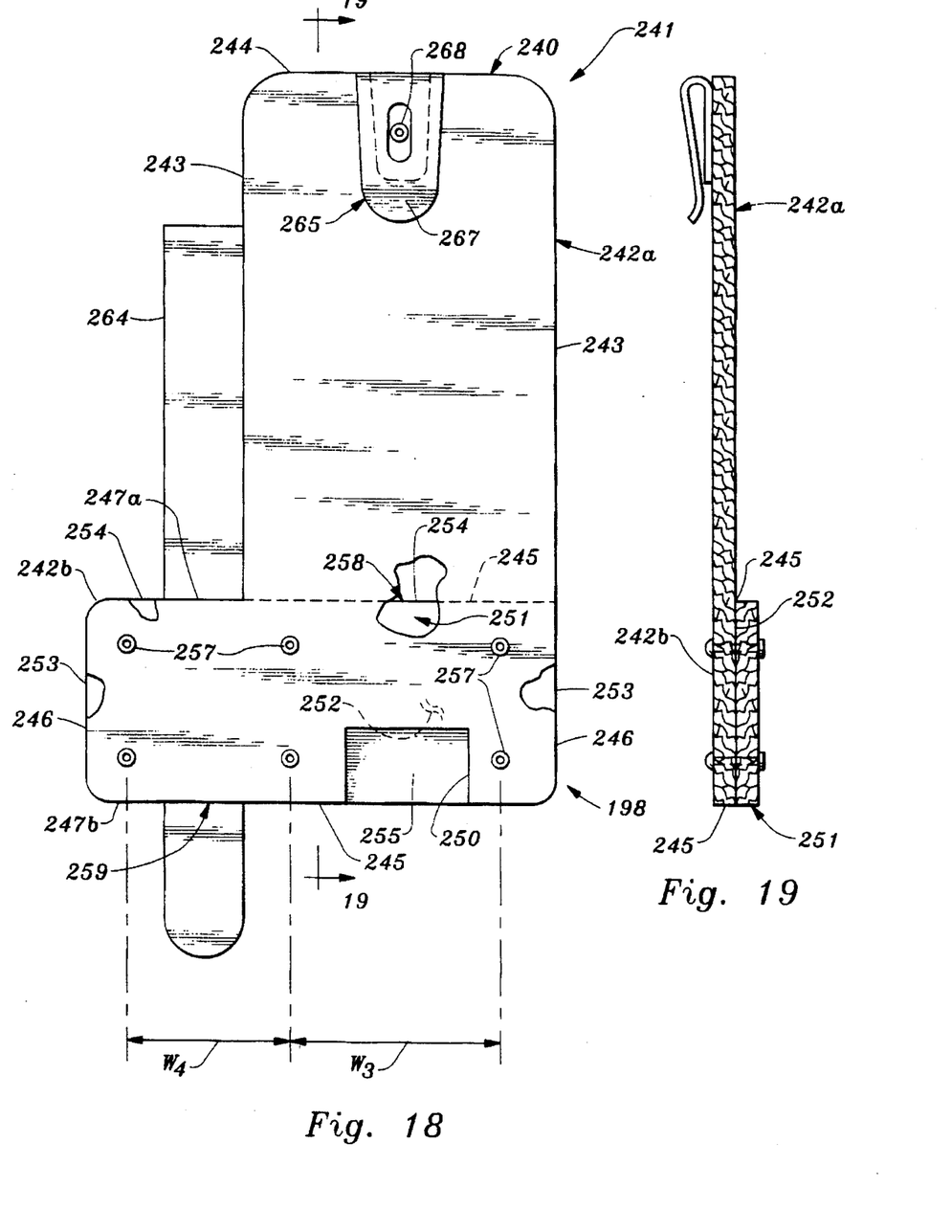
FIG. 18 is a rear plan view of still yet another embodiment of the holder of the invention which uses a single clip for attachment to the user's belt, such clip being located on the rear surface of the back panel wherein the back panel shape is changed to L-shaped to provide a pair of side-by-side pockets for stowage of a carpenter's pencil and a measuring tape, respectively.
FIG. 19 is a section taken along line 19—19 of FIG. 18.

FIGS. 18 and 19 shows a back panel 240 of a further modified holder 241 of the invention, such back panel 240 forming the longitudinal leg 242a of a L-shaped in cross section panel member 198 that also includes transverse leg 242b. The longitudinal leg 242a includes a pair of upright side edges 243, a top edge 244 and an imaginary bottom edge 245 integrally attached to the transverse leg 242b. The transverse leg 242b cantilevers from the integrally formed bottom edge 245 of the longitudinal leg 242a and includes end edges 246 parallel to the pair of side edges 243 of the longitudinal leg 242a, and a pair of side edges 247a, 247b parallel to the top and bottom edges 244, 245 of the longitudinal leg 242a. A notch 250 is formed in the transverse leg 242b of the back panel 240.

Front panel 251 is located atop front surface 252 of the transverse leg 242b of the back panel 240 and is fully coextensive therewith. That is, side edges 253 of the front panel 251 is coincident with the end edges 246; upper edge 254 is parallel and has segments that are positionally coincident with both integrally formed bottom edge 245 of the longitudinal leg 242a and side edge 247a of the transverse leg 242b; and lower edge 255 is parallel and is positionally coincident with the bottom edge 245 of the transverse leg 242b. Its attachment to the front surface 252 of the transverse leg 242b of the back panel 240 is by means of six rivets 257 placed in two rows of three rivets each, so as to define a pair of side-by-side pockets 258, 259 along the transverse leg 242b, such rivets 257 as similar to that depicted in FIG. 8.

Transverse widths W3 and W4 associated with the pockets 258 and 259 are defined between the three columns of the rivets 257, wherein W3 and W4. Both pockets 258, 259 thus defined is located between the front panel 251 and the transverse leg 242b of the back panel 240.

Note that the notch 250 and pocket 258 are dimensioned to aid in the releasable acceptance of the measuring tape 101 of FIG. 9 as explained before. Pocket 259 has openings in the manner hereinbefore explained, that provide dimensional presence to aid in the releasable acceptance of a carpenter's pencil 264.

Returning to FIGS. 18 and 19, attachment of the modified holder 241 relative to the user, is via a single clip 265. Such single clip 265 is of tear-dropped cross section having a fixed leg 266 and cantilevered leg 267 similar to that previously described in FIGS. 5–7 riveted to the back panel 240 via pop rivet 268.

Other embodiments and modifications of the invention will readily come to those of ordinary skill in the art having the benefit of the teachings present in this description and drawings. It is therefore to be understood that such various changes are to be considered within the principles and scope of the invention.

What is claimed is:

1. A holder for a measuring tape comprising a planar back panel of rectangular cross section having a first longitudinal axis of symmetry, a front surface terminating in top, bottom and side edges, and a rear surface similar in shape to said front surface; a front panel also of rectangular cross section defining a second longitudinal axis of symmetry parallel to said first longitudinal axis of symmetry and attached to said back panel to form a tight-fitting pocket therebetween at a position between said side edges but adjacent to said bottom edge of said back panel; and a series of rivets for attaching said front and rear panels together to form said tight-fitting pocket therebetween, said back panel including a rectangular notch formed therein having an opening starting at said bottom edge of said back panel and terminating in side walls and at least one end wall defining dimensions that permit a cantilevered free leg of a conventional tear-dropped clip of a measuring tape to disconnectably reside when said clip is inserted into said pocket said back panel also including a pair of longitudinally extending slots each having a third longitudinal axis of symmetry parallel to said first and second axes of symmetry of said back panel and said front panel, respectively, and offset a common distance therefrom adjacent to said side edges of said back panel to define therebetween, a first central region associated with said front surface and a second central region associated with said rear surface, said first and second central regions being bisected by said first and second axes of symmetry and being each positioned between said pair of slots.

2. The holder of claim 1 with the addition of a user's belt having a non-buckle end and adapted to serpentine through said longitudinally extending slots of said back panel to at least support said holder relative thereto.

3. The holder of claim 2 in which said non-buckle end of said belt is adapted to serpentine through said pair of slots in a direction that starts form said front surface of said back panel through one of said slots, thence across said second central region of said rear surface of said back panel, and finally through said other slot.

4. A holder for a measuring tape comprising a planar back panel having a longitudinal axis of symmetry, a front surface terminating in top, bottom and side edges, a rear surface similar in shape to said front surface and a notch of rectangular cross section penetrating said front and rear surfaces that is bisected by said longitudinal axis of symmetry, said notch starting at said bottom edge of said back panel and terminating in side walls and at least one end wall having dimensions that permit a cantilevered free leg of a conventional tear-dropped clip of a measuring tape to disconnectably reside therein, said back panel also defining a longitudinal leg of a L-shaped panel member in which said longitudinal leg is defined by said longitudinal axis of symmetry of said back panel, said L-shaped panel member also including a transverse leg cantilevered from and offset from said longitudinal leg, said transverse leg being formed with respect to said longitudinal leg wherein said notch is positioned adjacent said bottom edge of said back panel, a front panel of rectangular cross section positioned in parallel relationship with said transverse leg between said side edges but adjacent to said bottom edge of said back panel, a series of rivets for attaching said front panel to at least said transverse leg to form a pair of side-by-side tight fitting pockets therebetween wherein one pocket is used to releasably stow the clip of said measuring tape therein such that the clip resides within said notch and the other pocket is used to releasably stow a carpenter's pencil therein, and a tear-dropped shaped clip means attached to said longitudinal leg adjacent to said top edge of said back panel for releasable attachment of said holder relative to a user's belt.

5. The holder of claim 4, in which said series of rivets for attaching said front and back panels together, are six in number and are placed in two rows and three columns to form said side-by-side pockets.

6. The holder of claim 4, in which tear-drop shaped clip means for attaching said holder relative to a user comprises a single clip including a fixed leg rivetally attached to said longitudinal leg and a cantilevered free leg integrally attached to said fixed leg at a common transverse junction, said free leg cantilevering from said fixed leg to define a terminating tip bent under tension to rest against said longitudinal leg but movable therefrom in an opposite direction for attachment to a belt of said user.

7. A carpenter's device comprising, in combination a measuring tape comprising a cylindrical housing having a central cavity, a spired measuring tape releasably positioned within said cavity, and a clip attached to an exterior surface of said housing, said clip of tear-dropped cross section including fixed and free legs integrally attached at a common transverse junction, said free leg cantilevering from said fixed leg to define a terminating tip bent under tension to rest against housing but movable therefrom in an opposite direction, a holder for said measuring tape comprising a planar back panel having a longitudinal axis of symmetry, a front surface terminating in top, bottom and side edges, a rear surface similar in shape to said front surface and a notch of rectangular cross section starting at said bottom edge of said back panel, penetrating said front and rear surfaces and terminating in side walls and at least one end wall, said notch having dimensions that permit said cantilevered free leg of said tear-dropped clip of said measuring tape to disconnectably reside therein, said back panel including a longitudinal leg of a L-shaped panel member in which said longitudinal leg is defined by said longitudinal axis of symmetry of said back panel, said L-shaped panel member also including a transverse leg cantilevered from and offset from said longitudinal leg, and transverse leg being formed with respect to said longitudinal leg wherein said notch is positioned adjacent said bottom edge of said back panel, a front panel of rectangular cross section positioned in parallel relationship with said transverse leg, a series of rivets for attaching said front panel to at least said transverse leg to form a pair of side-by-side tight fitting pockets therebetween wherein one pocket is used to releasably stow said clip of said measuring tape therein such that said clip resides within said notch and the other pocket is used to releasably stow a carpenter's pencil therein, and a tear-dropped shaped clip means attached to said longitudinal leg adjacent to said top edge of said back panel for releasable attachment of said holder relative to a user's belt.

8. The carpenter's device of claim 7, in which said series of rivets for attaching said front and back panels together, are six in number and are placed in two rows and three columns to form said side-by-side pockets.

9. The carpenter's device of claim 7, in which said tear-drop shaped clip means for attaching said holder relative to the user comprises a single clip including a fixed leg rivetally attached to said longitudinal leg and a cantilevered free leg integrally attached to said fixed leg at a common transverse junction, said free leg cantilevering from said fixed leg to define a terminating tip bent under tension to rest against said longitudinal leg but movable therefrom in an opposite direction for attachment to the belt of said user.

* * * * *